United States Patent
Kudo

(10) Patent No.: US 6,784,931 B1
(45) Date of Patent: Aug. 31, 2004

(54) AMPLIFICATION TYPE SOLID STATE IMAGING DEVICE

(75) Inventor: Hiroaki Kudo, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 836 days.

(21) Appl. No.: 09/672,925

(22) Filed: Sep. 28, 2000

(30) Foreign Application Priority Data

Sep. 30, 1999 (JP) ............................................. 11-278029

(51) Int. Cl.[7] ................................................ H04N 3/14
(52) U.S. Cl. ........................ 348/296; 348/241; 348/308; 250/208.1; 257/292
(58) Field of Search ................................ 348/296, 241, 348/294, 301, 302, 304, 307, 308, 248; 250/208.1; 257/291, 292

(56) References Cited

U.S. PATENT DOCUMENTS

| | | | | |
|---|---|---|---|---|
| 5,276,521 A | * | 1/1994 | Mori | 348/301 |
| 5,410,348 A | * | 4/1995 | Hamasaki | 348/296 |
| 5,420,631 A | * | 5/1995 | Hamasaki | 348/241 |
| 5,774,180 A | * | 6/1998 | Abe et al. | 348/241 |
| 5,796,431 A | * | 8/1998 | Yonemoto | 348/308 |
| 5,844,234 A | * | 12/1998 | Kawazoe | 250/208.1 |
| 5,998,818 A | * | 12/1999 | Kumagai et al. | 257/291 |
| 6,088,058 A | * | 7/2000 | Mead et al. | 348/296 |
| 6,163,023 A | * | 12/2000 | Watanabe | 250/208.1 |
| 6,239,839 B1 | * | 5/2001 | Matsunaga et al. | 348/308 |

FOREIGN PATENT DOCUMENTS

| | | | | |
|---|---|---|---|---|
| EP | 1150494 A2 | * 10/2001 | | H04N/3/15 |
| JP | 08163448 A | * 6/1996 | | H04N/5/335 |
| JP | 2000125203 A | * 4/2000 | | H04N/5/335 |
| JP | 2000324398 A | * 11/2000 | | H04N/5/335 |

* cited by examiner

*Primary Examiner*—Wendy R. Garber
*Assistant Examiner*—John M Villecco
(74) *Attorney, Agent, or Firm*—Edwards & Angell, LLP; David G. Conlin

(57) ABSTRACT

An amplification type solid state imaging device of the present invention includes a plurality of pixels arranged in a matrix each of which includes: a photodiode for photoelectric conversion; a signal amplification MOS transistor which functions as an amplifier for amplifying a change in the potential of the photodiode; a pixel selection MOS transistor; and a reset MOS transistor for resetting the potential of the photodiode to a predetermined initial potential, gate terminals of the selection MOS transistors of the pixels along each row being commonly connected together with a predetermined signal read pulse being applied to the gate terminals, gate terminals of the reset MOS transistors of the pixels along each row being commonly connected together with a predetermined reset pulse being applied to the gate terminals, and terminals on one end of the selection MOS transistors of the pixels along each column being commonly connected together to form a signal line, wherein a shutter reset operation is performed by applying a shutter operation reset pulse to the gate terminals of the reset MOS transistors during a period which is different from a period during which the reset pulse is applied to the gate terminals of the reset MOS transistors in a pixel signal read operation. The shutter operation reset pulse is applied to the gate terminals of the reset MOS transistors in a state where a potential of the signal line is set to a predetermined fixed potential.

4 Claims, 8 Drawing Sheets

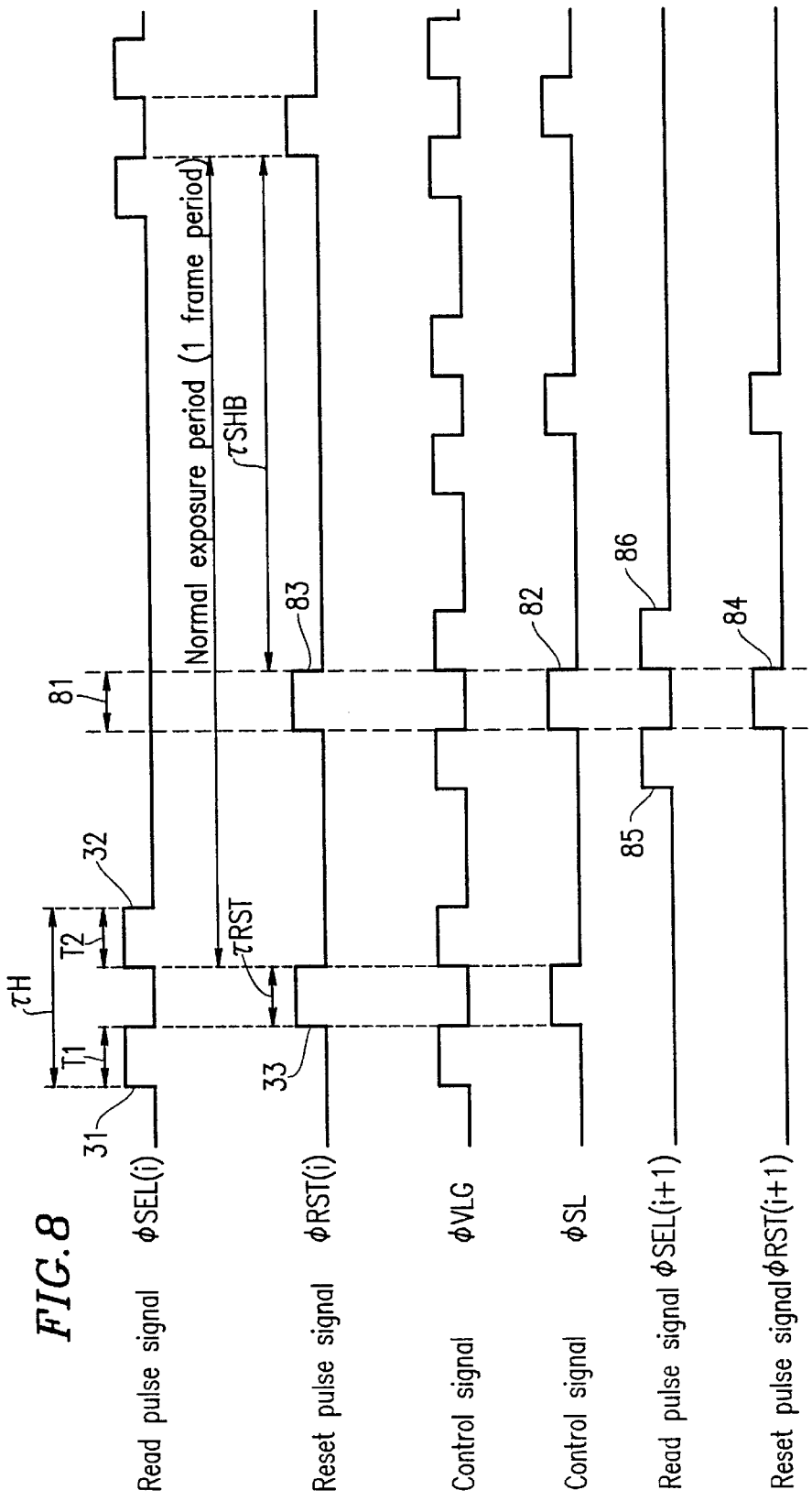

AMPLIFICATION TYPE SOLID STATE IMAGING DEVICE

BACKGROUND OF THE INVENTION

1. Field of the Invention

The present invention relates to an amplification type solid state imaging device. More particularly, the present invention relates to the exposure time control and the shutter operation for an amplification type solid state imaging device.

2. Description of the Related Art

An amplification type solid state imaging device having a plurality of pixels each of which is formed by a photodiode and a MOS transistor has been known in the art.

A conventional amplification type solid state imaging device has a plurality of pixels arranged in a matrix. Each pixel includes: a photodiode for photoelectric conversion; a signal amplification MOS transistor which functions as an amplifier for amplifying a change in the potential of the photodiode; a pixel selection MOS transistor; and a reset MOS transistor for resetting the potential of the photodiode to a predetermined initial potential. The gate terminals of the selection MOS transistors of the pixels along each row are commonly connected to a row line, and a predetermined signal read pulse is applied to these gate terminals. The gate terminals of the reset MOS transistors of the pixels along each row are commonly connected to a row line, and a predetermined reset pulse is applied to these gate terminals via a row line. Terminals on one end of the selection MOS transistors of the pixels along each column are commonly connected to a column line to form a column line. The amplification type solid state imaging device performs a shutter reset operation by applying a shutter operation reset pulse to the gate terminals of the reset MOS transistors during a period which is different from the period during which the reset pulse is applied to the gate terminals of the reset MOS transistors.

However, when a shutter reset operation is performed on the pixels along the $(i+1)^{th}$ row while, at the same time, the pixels along the $i^{th}$ row (from which image signals are being read out) are imaging a high brightness object, the potential of a column line to which signals from the pixels along the $i^{th}$ row are applied decreases. Therefore, the reference potential of the photodiode of a pixel along the $(i+1)^{th}$ row shifts from the intended level after the shutter reset operation. Thus, ghost noise appears on the screen which displays the image taken by the solid state-imaging device.

SUMMARY OF THE INVENTION

According to one aspect of this invention, there is provided an amplification type solid state imaging device, including a plurality of pixels arranged in a matrix each of which includes: a photodiode for photoelectric conversion; a signal amplification MOS transistor which functions as an amplifier for amplifying a change in the potential of the photodiode; a pixel selection MOS transistor; and a reset MOS transistor for resetting the potential of the photodiode to a predetermined initial potential, gate terminals of the selection MOS transistors of the pixels along each row being commonly connected together with a predetermined signal read pulse being applied to the gate terminals, gate terminals of the reset MOS transistors of the pixels along each row being commonly connected together with a predetermined reset pulse being applied to the gate terminals, and terminals on one end of the selection MOS transistors of the pixels along each column being commonly connected together to form a signal line, wherein a shutter reset operation is performed by applying a shutter operation reset pulse to the gate terminals of the reset MOS transistors during a period which is different from a period during which the reset pulse is applied to the gate terminals of the reset MOS transistors in a pixel signal read operation, wherein the shutter operation reset pulse is applied to the gate terminals of the reset MOS transistors in a state where a potential of the signal line is set to a predetermined fixed potential.

In one embodiment of the invention, the shutter operation reset pulse is applied to the gate terminals of the reset MOS transistors during a period immediately after a reset signal read period in the pixel signal read operation.

In one embodiment of the invention, the amplification type solid state imaging device includes fixed potential supply means for supplying the predetermined fixed potential to the signal line, wherein the shutter operation reset pulse is applied to the gate terminals of the reset MOS transistors by the fixed potential supply means in a period during which the fixed potential is supplied to the signal line.

In one embodiment of the invention, the fixed potential is supplied to the signal line by the fixed potential supply means in a period during which the reset pulse is applied to the gate terminals of the reset MOS transistors in the pixel signal read operation for a given row; and the shutter operation reset pulse is applied in said period to the gate terminals of the reset MOS transistors of the pixels along a different row.

Thus, the invention described herein makes possible the advantages of providing an amplification type solid state imaging device capable of obtaining a uniform image without ghost noise due to a shutter reset operation.

This and other advantages of the present invention will become apparent to those skilled in the art upon reading and understanding the following detailed description with reference to the accompanying figures.

BRIEF DESCRIPTION OF THE DRAWINGS

FIG. 8 is a driving signal waveform diagram illustrating the operation of the amplification type solid state imaging device according to Embodiment 2 of the present invention.

DESCRIPTION OF THE PREFERRED EMBODIMENTS

Embodiment 1

Figure 1:
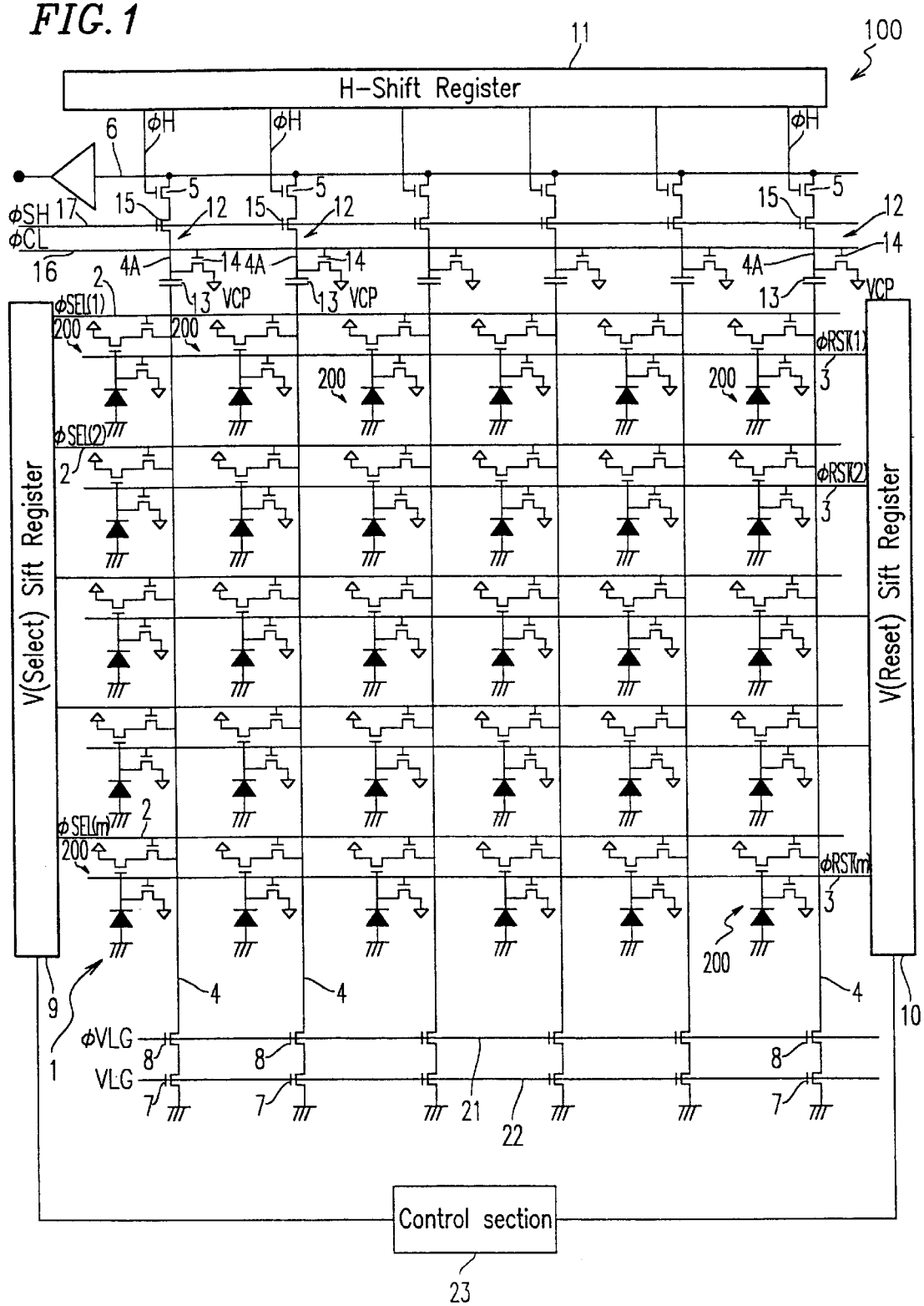
FIG. 1 illustrates a circuit configuration of an amplification type solid state imaging device according to Embodiment 1 of the present invention.
Figure 2:
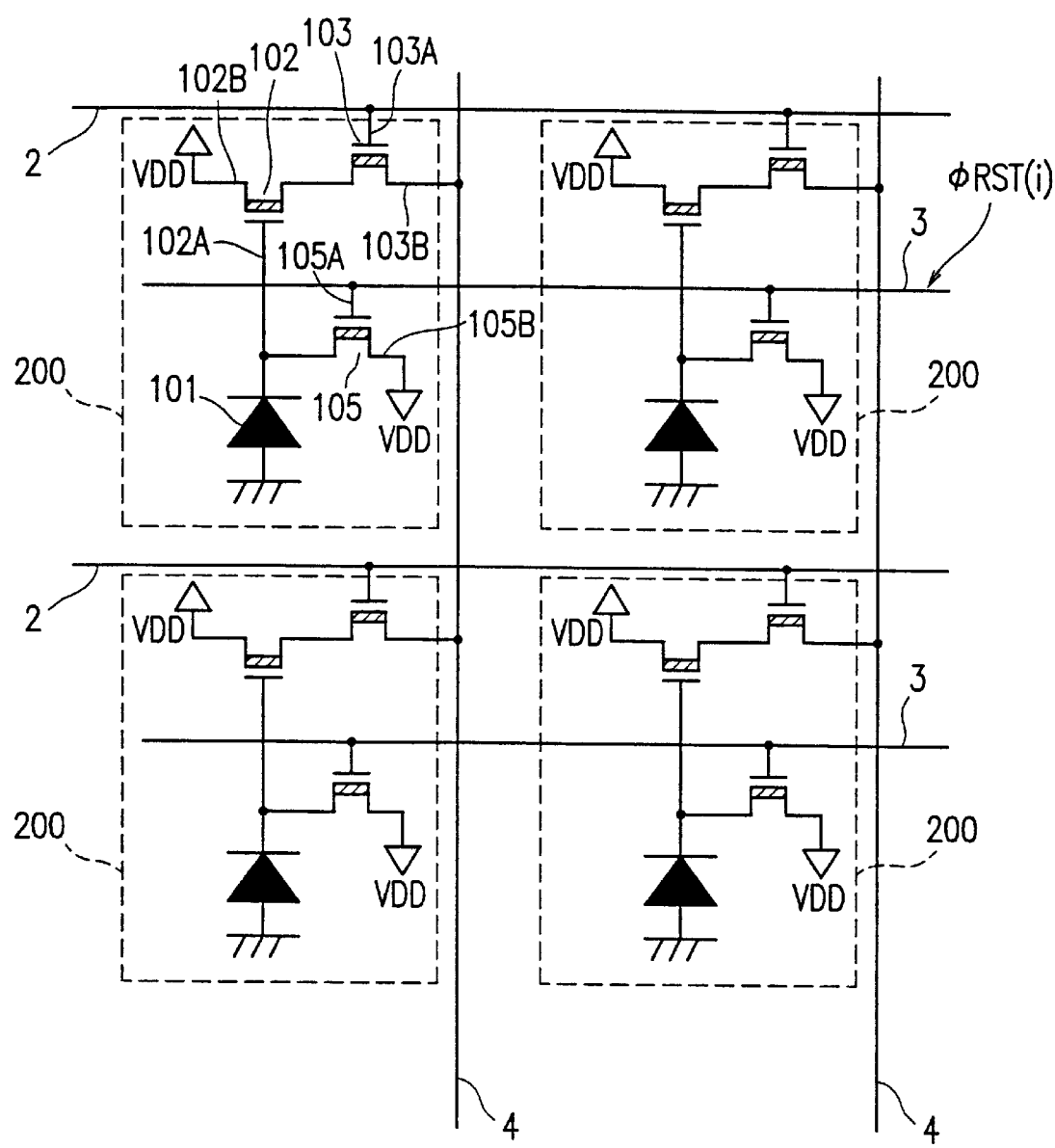
FIG. 2 illustrates a circuit configuration of each pixel provided in the amplification type solid state imaging device according to Embodiment 1 of the present invention.

FIG. 1 illustrates a configuration of an amplification type solid state imaging device 100 according to Embodiment 1 of the present invention. FIG. 2 illustrates the pixel configuration of the amplification type solid state imaging device 100. Referring to FIG. 1, the amplification type solid state imaging device 100 includes a pixel array 1, row lines 2 and 3, column lines 4 and 4A, a first vertical scanning circuit 9, a second vertical scanning circuit 10, a control section 23, an image signal line 6, column selection MOS transistors 5, a horizontal scanning circuit 11, a plurality of, CDS (correlated double sampling) circuits 12, a clamp pulse line 16, and a sample/hold pulse line 17. The pixel array 1 includes a plurality of pixels 200 which are arranged in a matrix. Referring to FIG. 2, each pixel 200 includes a photodiode 101, an amplifier MOS transistor 102, a pixel selection MOS transistor 103, and a reset MOS transistor 105. Referring again to FIG. 1, the solid state imaging device 100 further includes constant current source connection control MOS transistors 8, constant current load MOS transistors 7, a constant current line 21, and a constant current load line 22.

Referring again to FIG. 2, the photodiode 101 provides a potential which changes according to the amount of light incident thereon. The amplifier MOS transistor 102 provides an output potential which varies according to the change in the potential from the photodiode 101. The pixel selection MOS transistor 103 is used to select the pixel associated therewith, and outputs a signal to the column line 4. The reset MOS transistor 105 resets the potential of the photodiode 101 to a predetermined reset potential VDD.

Referring to FIGS. 1 and 2, each of the pixel selection MOS transistors 103 arranged in a row along the X (row) direction has a gate terminal 103A which is connected to the row line 2 of that row. Each of the reset MOS transistors 105 arranged in a row along the X (row) direction has a gate terminal 105A which is connected to the row line 3 of that row. Each row line 2 is connected to the first vertical scanning circuit 9 and receives therefrom a read pulse signal (row selection signal) φSEL (i.e., one of φSEL(1), φSEL(2), . . . , φSEL(m)). Each row line 3 is connected to the second vertical scanning circuit 10 and receives therefrom a reset pulse signal φRST (i.e., one of φRST(1), φRST(2), . . . , φRST(m)).

Each of the selection MOS transistors 103 arranged in a column along the Y (column) direction has a source terminal 103B which is connected to the column line (signal line) 4 of that column. The column lines 4 are commonly connected to the image signal line 6 respectively via the CDS (correlated double sampling) circuits 12 and the column selection MOS transistors 5. Each CDS circuit 12 includes a clamp capacitor 13, a clamp MOS transistor 14, and a sample/hold MOS transistor 15. The CDS circuit 12 will be more fully described later.

The gate terminal of each column selection MOS transistor 5 is connected to the horizontal scanning circuit 11 and receives a column selection signal φH from the horizontal scanning circuit 11. The other end of each column line 4 is respectively grounded via the constant current source connection control MOS transistors 8 and the constant current load MOS transistors 7. The gate terminals of the constant current source connection control MOS transistors 8 are commonly connected to the constant current source line 21 and receive an ON/OFF control signal φVLG via the constant current source line 21. The gate terminals of the constant current load MOS transistors 7 are commonly connected to the constant current load line 22 and receive a predetermined DC bias voltage VLG via the constant current load line 22.

In each pixel 200, a predetermined potential VDD is applied to a drain terminal 102B of the amplifier MOS transistor 102 and to a drain terminal 105B of the reset MOS transistor 105.

The CDS circuit 12 will now be described in detail.

As described above, each of the CDS circuits 12 includes a clamp capacitor 13, a clamp MOS transistor 14, and a sample/hold MOS transistor 15.

The column line 4A in each CDS circuit 12 is AC-coupled with the column line 4 and connected to a predetermined clamp potential VCP via the clamp MOS transistor 14. The gate terminals of the clamp MOS transistors 14 are commonly connected to the clamp pulse line 16 and receive a clamp pulse φCL via the clamp pulse line 16. Thus, when the clamp pulse φCL is applied, the column line 4A is clamped at the predetermined clamp potential VCP. The gate terminals of the sample/hold MOS transistors 15 are commonly connected to the sample/hold pulse line 17 and receive a sample/hold pulse φSH via the sample/hold pulse line 17. Thus, when the sample/hold pulse φSH is applied, the respective signal potentials of the column lines 4A are transmitted to the input side terminals of the column selection MOS transistors 5.

Figure 3:
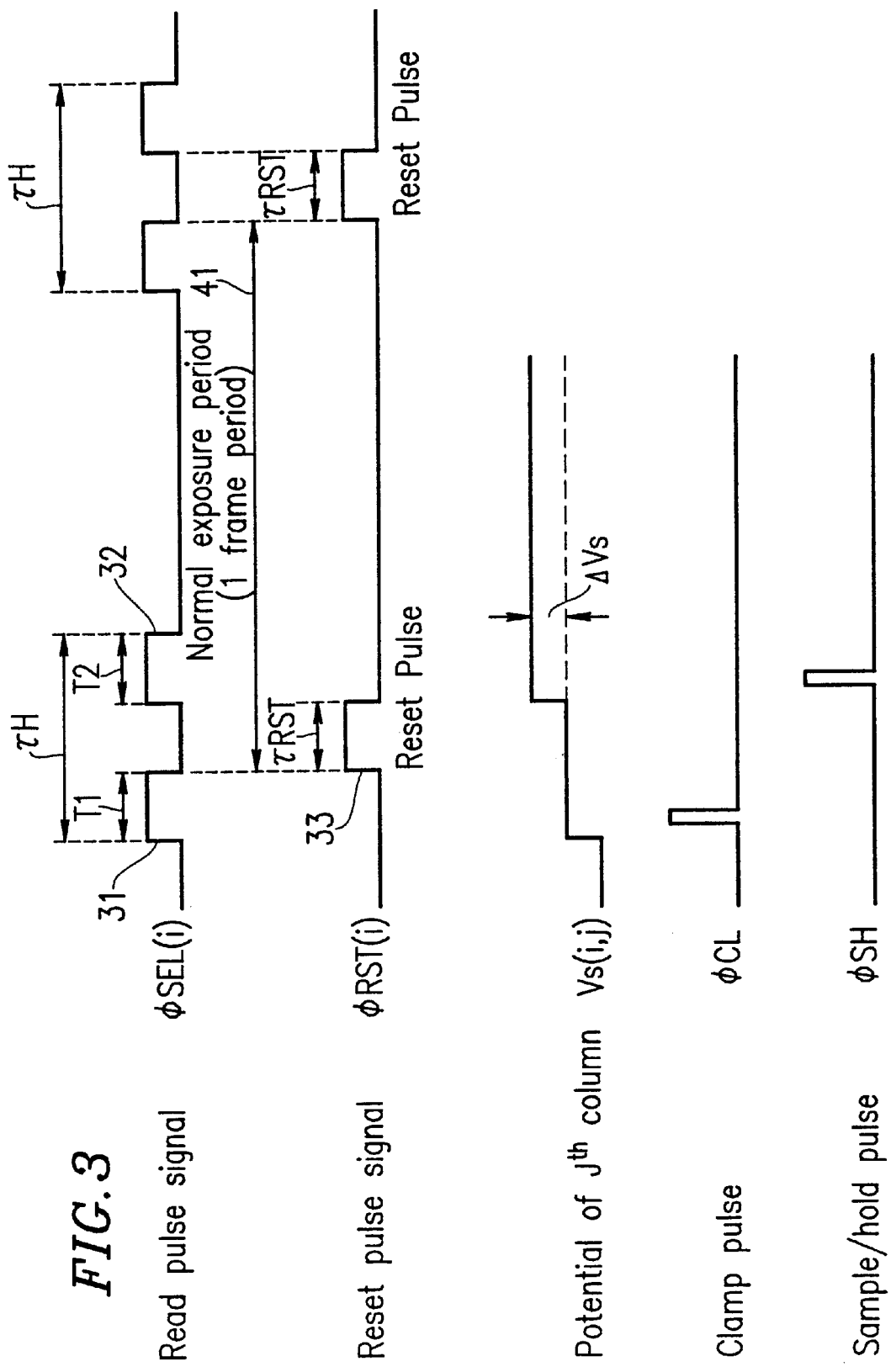
FIG. 3 is a signal waveform diagram illustrating the signal read operation performed by the amplification type solid state imaging device according to Embodiment 1 of the present invention.

FIG. 3 is a signal waveform diagram illustrating an operation of the amplification type solid state imaging device 100 shown in FIG. 1.

During a scanning period (horizontal blanking period) τH for a given row ($i^{th}$ row) the pixel selection MOS transistor 103 of each pixel 200 is turned ON twice (in periods T1 and T2) by the read pulse signal φSEL(i). During a reset period τRST in the scanning period τH (a period during which the pixel selection MOS transistor 103 is OFF), the reset MOS transistor 105 is turned ON in response to a reset pulse 33 which is applied by the reset pulse signal φRST(i).

Now, the operation of the amplification type solid state imaging device 100 will be described.

The first vertical scanning circuit 9 outputs a plurality of read pulse signals φSEL(1), φSEL(2), . . . , φSEL(m). The pixels 200 in the $i^{th}$ row provides the output signals to the respective column lines 4 when only the read pulse signal φSEL(i) for the $i^{th}$ row (which is applied to the pixel selection MOS transistor 103 of the $i^{th}$ row) is at a high level with the other read pulse signals φSEL being at a low level and the ON/OFF control signal φVLG applied to the constant current source connection control MOS transistors 8 is at a high level. The column line 4 of the $j^{th}$ column has a potential as indicated as Vs(i,j) in FIG. 3. When the clamp pulse φCL of the CDS circuit 12 transitions to a high level, the clamp capacitors 13 of the CDS circuits 12 are charged according to the respective output signal potentials from the pixels 200. On the column line 4 side, the potentials of the clamp capacitors 13 are clamped at the output signal potentials from the respective pixels 200. On the column line 4A side, the potentials of the clamp capacitors 13 are all clamped at the predetermined clamp potential VCP.

Then, the potential of the photodiode 101 of each pixel 200 in the $i^{th}$ row is reset to the predetermined reset potential VDD when the read pulse signals φSEL(1), φSEL(2), . . . , φSEL(m) from the first vertical scanning circuit 9 are all at the low level, and the ON/OFF control signal φVLG is at the low level, and the reset pulse signal φRST(i) (which is applied to the reset MOS transistors 105 of the pixel 200 in the $i^{th}$ row) is at the high level with the other reset pulse signals φRST being at the low level.

Then, the reset output signals from the pixels 200 in the $i^{th}$ row are output to the respective column lines 4 when the reset pulse signals φRST(1), φRST(2), . . . , φRST(m) from the second vertical scanning circuit 10 are all at the low level, and the read pulse signals φSEL(i) for the $i^{th}$ row from the first vertical scanning circuit 9 (which is applied to the pixel selection MOS transistor 103 of the $i^{th}$ row) is at the high level with the other read pulse signals φSEL being at the low level and the ON/OFF control signal φVLG applied to the constant current source connection control MOS transistors 8 is at the high level. During this period, the sample/hold pulse φSH applied to each CDS circuit 12 transitions to the high level, in response to which the potential shift with respect to the predetermined clamp potential VCP, i.e., an output signal amplitude ΔVs from the associated pixel 200, occurring in each column line 4A in the CDS circuits 12 is transmitted to the input side terminals of the column selection MOS transistors 5.

Thereafter, the column selection MOS transistors 5 are successively turned ON in response to the column selection signal φH which is output from the horizontal scanning circuit 11 successively to the column selection MOS transistors 5, thereby transferring the output signals from the respective column line 4A to the image signal line 6.

Where the amplifier MOS transistors 102, the pixel selection MOS transistors 103 and the reset MOS transistors 105, which are all shown in FIG. 2, are all enhancement type transistors, while the threshold voltage Vth for the MOS transistors 102, 103 and 105 is 0.7 V, the reset voltage VDD therefor is 3.3 V, and the gate voltage Vgs applied to the gate of the reset MOS transistor 105 is 3.3 V. In such a case, the channel potential of the reset MOS transistor 105 cannot be increased to be greater than about 2.1 V.

Regarding the amplifier MOS transistor 102 and the pixel selection MOS transistor 103, which together form a source follower circuit, and the constant current load MOS transistors 7 and the constant current source connection control MOS transistors 8, which are shown in FIG. 1, if the reset potential VDD is 3.3 V, the gate voltage Vsw applied to the gates of the pixel selection MOS transistors 103 is 3.3 V, the gate voltage φVLG applied to the gates of the constant current source connection control MOS transistors 8 is 3.3 V, the gate voltage VLG applied to the gates of the constant current load MOS transistors 7 is 1.0 V, and the threshold voltage Vth for the MOS transistors 102, 103, 7 and 8 is 0.7 V, then, the actual output signal amplitude ΔVs from the pixel 200 is about 1.1 V.

In order to increase the absolute value of the output signal amplitude ΔVs, a depletion type NMOS transistor with a threshold voltage Vth of −1.0 V is employed as the amplifier MOS transistor 102 as shown in FIG. 2. A depletion NMOS transistor is employed similarly as the pixel selection MOS transistors 103 and as the reset MOS transistors 105.

Then, if the threshold voltage Vth for each of these depletion NMOS transistors is −1.0 V, the reset potential VDD is 3.3 V and the gate voltage Vgs applied to the gate of the reset MOS transistors 105 is 3.3 V, and the channel potential of the reset MOS transistors 105 is about 3.45 V. Thus, it is possible to increase the reset potential of the photodiode 101 to be about as high as the reset potential VDD. Moreover, because of the input/output characteristics of the source follower circuit, it is possible to ensure an output signal amplitude ΔVs of about 2.5 V.

However, when the gate voltage Vgs applied to the gate of the selection MOS transistor 103 is 0.0 V, the channel potential is about 0.8 V. Therefore, if the gate voltage VLG applied to the gates of the constant current load MOS transistors 7 is 1.1 V, the current cannot be turned OFF, thereby resulting in an increase in the power consumption.

In view of this, the constant current source connection control MOS transistors 8 (an enhancement type NMOS transistors) can be separately provided between the constant current load MOS transistors 7 and the pixel selection MOS transistors 103, and the constant current source connection control MOS transistors 8 can be turned ON simultaneously with the turning ON of the pixel selection MOS transistors 103, thereby reducing the power consumption.

Then, the actual output signal amplitude ΔVs is obtained by using the CDS circuit 12 as follows. First, the clamp MOS transistors 14 are driven by the clamp pulse φCL, irrespective of the pixel signal potential Vs(i,j) which has been read out by each pixel 200, so as to clamp the clamp capacitors 13 at the predetermined clamp potential VCP. Then, the sample/hold MOS transistors 15 are driven by the sample/hold pulse φSH so as to sample/hold a potential (the predetermined clamp potential VCP plus the actual output signal amplitude ΔVs) which corresponds to the actual output signal amplitude ΔVs. Thus, by clamping the clamp potential VCP by the clamp pulse φCL and sampling/holding the output signal amplitude after the reset operation (the predetermined clamp potential VCP plus the actual output signal amplitude φVs), it is possible to successively obtain for each and every horizontal scanning period a signal VSIG(i) which corresponds to the actual output signal amplitude φVs. The signal VSIG(i) can be successively output to the image signal line 6 by successively applying the column selection signal φH to the column selection MOS transistors 5 from the horizontal scanning circuit 11 during a read period (a period other than the horizontal blanking period τH).

Figure 4:
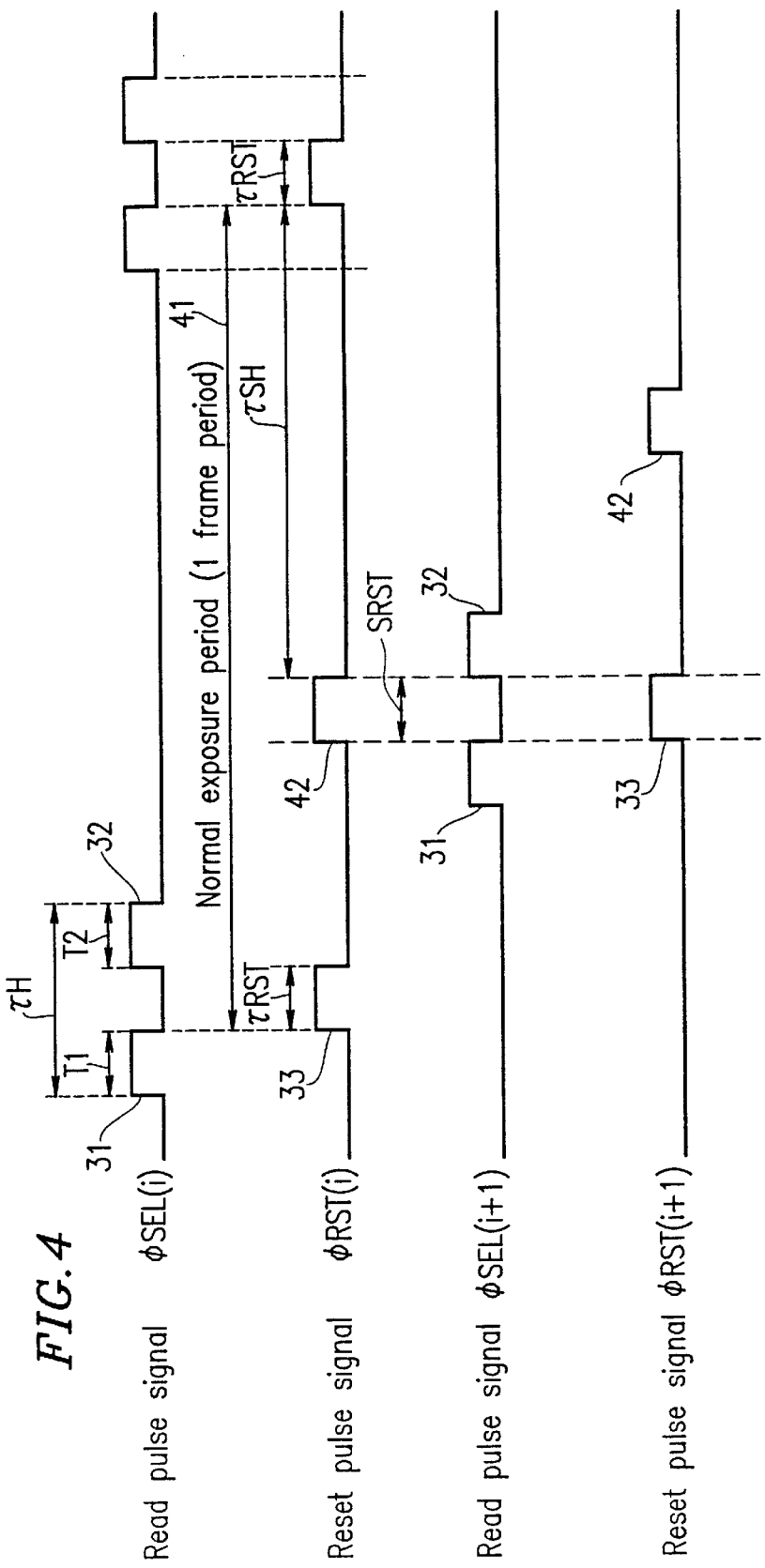
FIG. 4 is a signal waveform diagram illustrating the shutter operation performed by the amplification type solid state imaging device according to Embodiment 1 of the present invention.

FIG. 4 is a signal waveform diagram illustrating a shutter operation of the amplification type solid state imaging device 100 shown in FIG. 1. FIG. 4 illustrates a method for operating a shutter so as to control the exposure period τSH to be of an intended duration.

By setting the exposure period τSH according to the brightness of the object being imaged (so that the exposure period τSH is at longest equal to a one frame period), it is possible to obtain an optimal image for the brightness. For example, under a very bright environment, the shutter speed can be increased (by shortening the exposure period τSH) so as to prevent excessive exposure while also preventing other problems such as halation.

Referring to FIG. 4, read pulses 31 and 32 and a read reset pulse 33 are applied by the read pulse signals φSEL(i) and the reset pulse signal φRST(i), respectively, during a one frame period 41, which is normally equal to the signal accumulation period, in a manner similar to that shown in FIG. 3, so as to provide the scanning period τH and the reset period τRST. After the one frame period 41 and before the following read reset period τRST, a shutter reset pulse 42 is applied so as to provide another reset period SRST (a shutter reset pulse period) separate from the read reset period τRST, whereby it is possible to set the exposure period τSH to be shorter than the one frame period 41. Thus, it is possible to realize a shutter operation in which the exposure period τSH is shortened.

Figure 5:
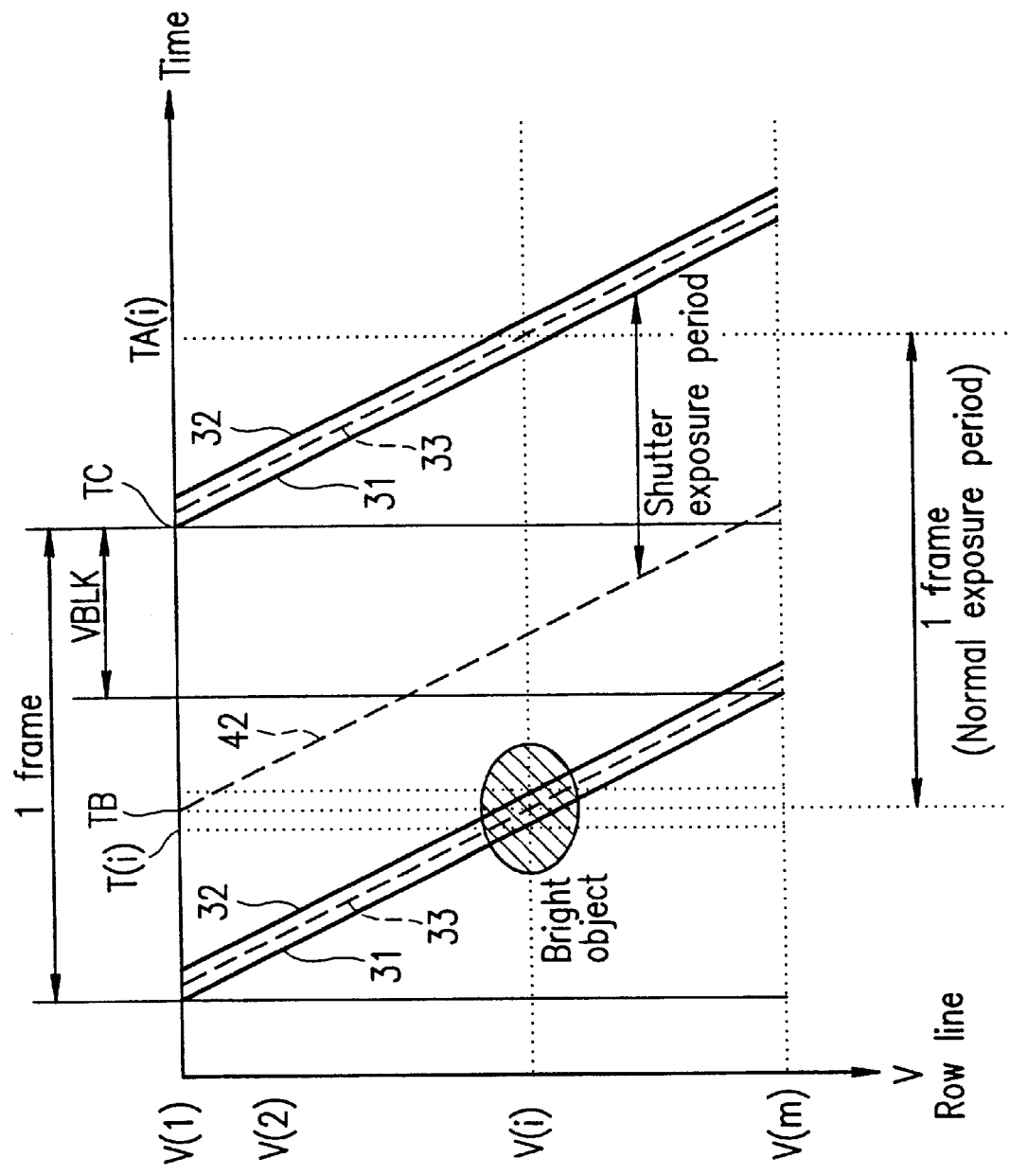
FIG. 5 is a timing diagram illustrating the operation of the amplification type solid state imaging device according to Embodiment 1 of the present invention for a one frame period.

Referring to FIG. 5, an operation for all the pixels 200 during a one frame period will be described.

In FIG. 5, the horizontal axis represents time, and the vertical axis represents the series of row lines arranged in the vertical direction (V(1), V(2), . . . , V(m)). In FIG. 5, VBLK denotes a vertical blanking period.

In a normal operation, the $i^{th}$ row line V(i) is selected at time T(i), and the read pulse 31, the read reset pulse 33 and the read pulse 32 are sequentially applied to the $i^{th}$ row line V(i). Then, the $i^{th}$ row line V(i) is again selected after a one frame period (a normal exposure period) or at time TA(i) (T(i)+1 frame period), and the read pulse 31, the read reset pulse 33 and the read pulse 32 are sequentially applied to the $i^{th}$ row line V(i) again.

Next, the above-mentioned shutter operation will be described. As shown in FIG. 5, the shutter reset pulse 42 is successively applied to the pixels along the row lines V(1), V(2), ..., V(i), ..., V(m) so that all pixels have the same exposure period.

The shutter reset pulse 42 is applied to the 1st row line V(1) at time TB when the read reset pulse 33 is applied to the pixel along another row line V(i). When the pixel is imaging a high brightness object is being read out, the potential of the column line 4 is different from that when the pixel imaging a low brightness object. Particularly, in a circuit configuration which employs the above-mentioned depletion type transistors for amplifying the output signal amplitude $\Delta$Vs, the column line 4 is floating when the shutter reset pulse 42 and the read reset pulse 33 are being applied. Moreover, the photodiode 101 of each pixel is also floating when the shutter reset pulse 42 and the read reset pulse 33 are being applied.

The column line 4 and the photodiode 101 together form a capacitive coupling, and the capacitance ratio therebetween is large (the photodiode 101 has a capacitance of about 5 fF, and the column line 4 has a capacitance of about 1 pF). As a result, the reference potential of the photodiode 101 after the reset operation shifts from the intended level due to the change in the potential of the column line 4.

Therefore, a problem arises as follows when the shutter reset operation is performed on a pixel along the row line V(1) while reading out another pixel (a pixel along the row line V(i)) which is imaging a high brightness object. That is, the potential of the column line 4 to which the pixel signal is output from the pixel (a pixel along the row line V(i)) which is imaging a high brightness object is significantly different from the reference potential of the photodiode 101 after the reset operation (the potential of the column line 4 is reduced to be as low as about 0.8 V). As a result, after resetting the photodiode 101, the reference potential of the pixel (along the row line V(1)) on which the shutter reset operation is being performed becomes VDD+$\Delta$V ($\Delta$V=about 10 mV) which is slightly shifted from what it should be reset to (i.e., VDD (3.3 V)), due to the capacitive coupling.

Then, at time TC, a signal having a potential which is obtained by reducing the output signal amplitude $\Delta$Vs from the reference potential (VDD+$\Delta$V) is read out to the column line 4 from the pixel along the row line V(1) on which the above-described shutter operation has been performed. Then, when the read reset pulse 33 is applied to the reset MOS transistor 105, the reset MOS transistor 105 is not influenced by the pixel along another row line which is imaging a high brightness object, whereby the photodiode 101 of the pixel along the row line V(1) is reset to VDD. The potential difference between the photodiode 101 and the column line 4 is VDD−(VDD+$\Delta$V−$\Delta$Vs)=$\Delta$Vs−$\Delta$V. As a result, the signal level of the photodiode 101 is reduced by $\Delta$V. Thus, ghost noise appears on the screen which displays the image taken by the solid state imaging device 100.

Figure 6:
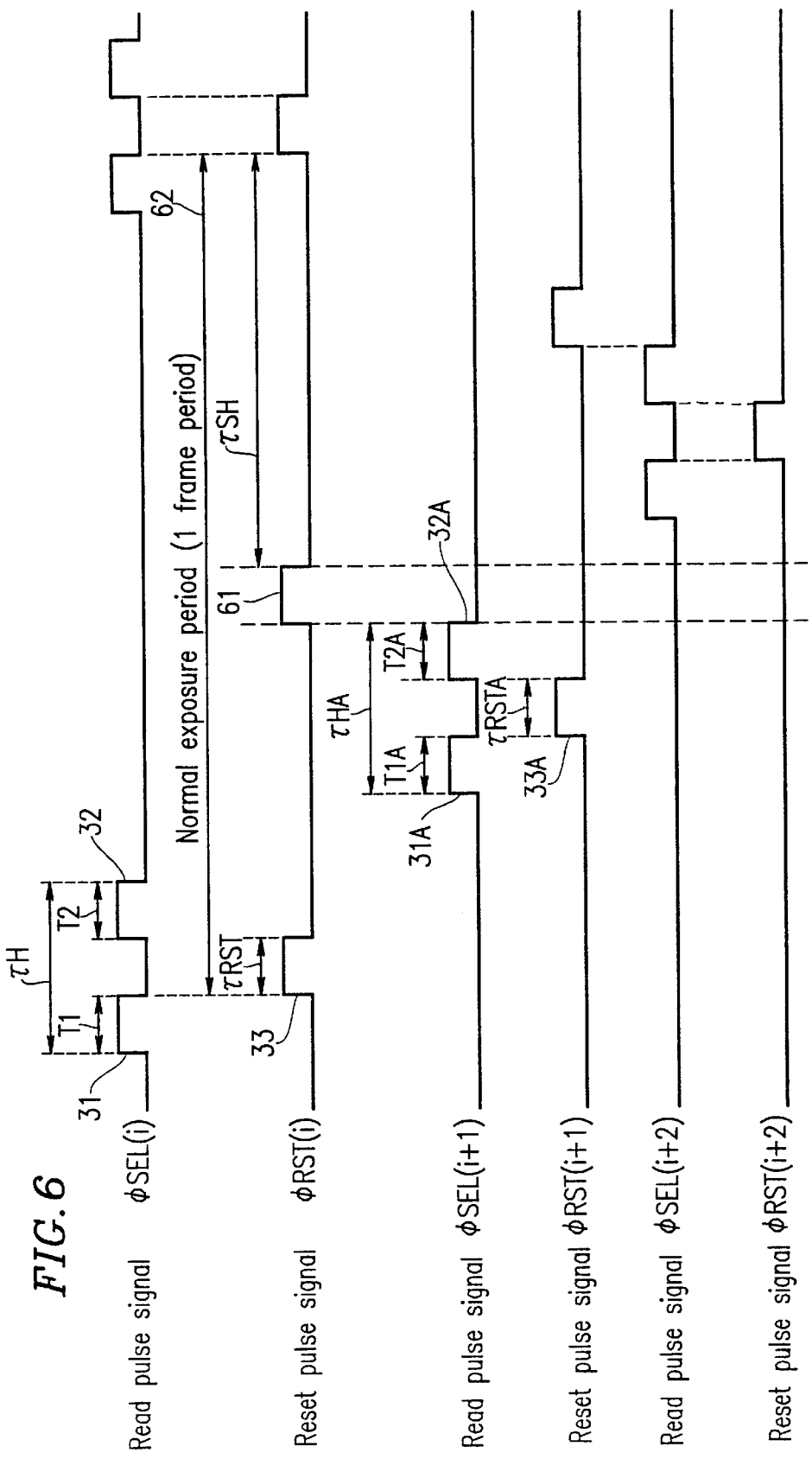
FIG. 6 is a driving signal waveform diagram illustrating the operation of the amplification type solid state imaging device according to Embodiment 1 of the present invention.

FIG. 6 is a driving signal waveform diagram illustrating the operation of the amplification type solid state imaging device 100 according to Embodiment 1 of the present invention. The operation of the amplification type solid state imaging device 100 according to Embodiment 1 will now be described with reference to FIG. 6.

When reading out a signal from a pixel along the $i^{th}$ row line V(i), the control section 23 (FIG. 1) controls the first vertical scanning circuit 9 so that the first vertical scanning circuit 9 applies the read pulse 31 during the scanning period $\tau$H. In order to obtain the actual output signal amplitude $\Delta$Vs by using the CDS circuit 12 described above, the second vertical scanning circuit 10 is controlled so that the second vertical scanning circuit 10 applies the read reset pulse 33 to the reset MOS transistor 105 during the read reset period $\tau$RST in the scanning period $\tau$H. In the read reset period $\tau$RST, the photodiode 101 is reset to the reset potential VDD. The control section 23 controls the first vertical scanning circuit 9 so that the first vertical scanning circuit 9 applies the read pulse 32 to the selection MOS transistors 103. Thus, the potential of the column line 4 becomes equal to a column line potential Vrst which is determined according to the reset potential VDD of the photodiode 101.

Next, the shutter reset operation will be described. Referring to FIG. 6, during the read reset period $\tau$RST within the read period, the photodiode 101 is reset to the reset potential VDD. The second vertical scanning circuit 10 applies a shutter reset pulse 61 to the reset MOS transistor 105 during another period within a one frame period 62 other than the scanning period $\tau$H. Therefore, the exposure period $\tau$SH can be reduced to be shorter than the normal exposure period 62.

In this embodiment, the control section 23 controls the second vertical scanning circuit 10 so that the second vertical scanning circuit 10 applies the shutter reset pulse 61 to the $i^{th}$ row line V(i) except the scanning period $\tau$HA for another row line (the $(i+1)^{th}$ row line). Each column line 4 has a column line potential Vrst which is determined according to the reset potential VDD of the photodiode 101 of the (i+1)th row line V(i+1). AT this timing, the second vertical scanning circuit 10 applies the shutter reset pulse 61 to the $i^{th}$ row line V(i). Therefore, even if photodiode 101 along the $i^{th}$ row line V(i) is capacitively coupled with the column line 4, the reference potential of the photodiode 101 of the $i^{th}$ row line V(i) does not vary for different pixels.

Thus, even when a high brightness object is being imaged, there is no variation in the reference potential of the photodiode 101 of the pixel on which the shutter reset operation has been performed, which would otherwise occur when performing the shutter reset operation while imaging a high brightness object. Therefore, no ghost noise will occur.

Embodiment 2

In Embodiment 1 described above, the period in which the shutter reset pulse is applied is limited to the period except the reset signal read operation (i.e., except the scanning period $\tau$HA). According to Embodiment 2 to be described below, which may require additional circuits as compared with Embodiment 1, the shutter reset operation can be performed in the normal read reset period or some other periods (i.e., periods other than the pixel signal read period and the reset signal read period).

Figure 7:
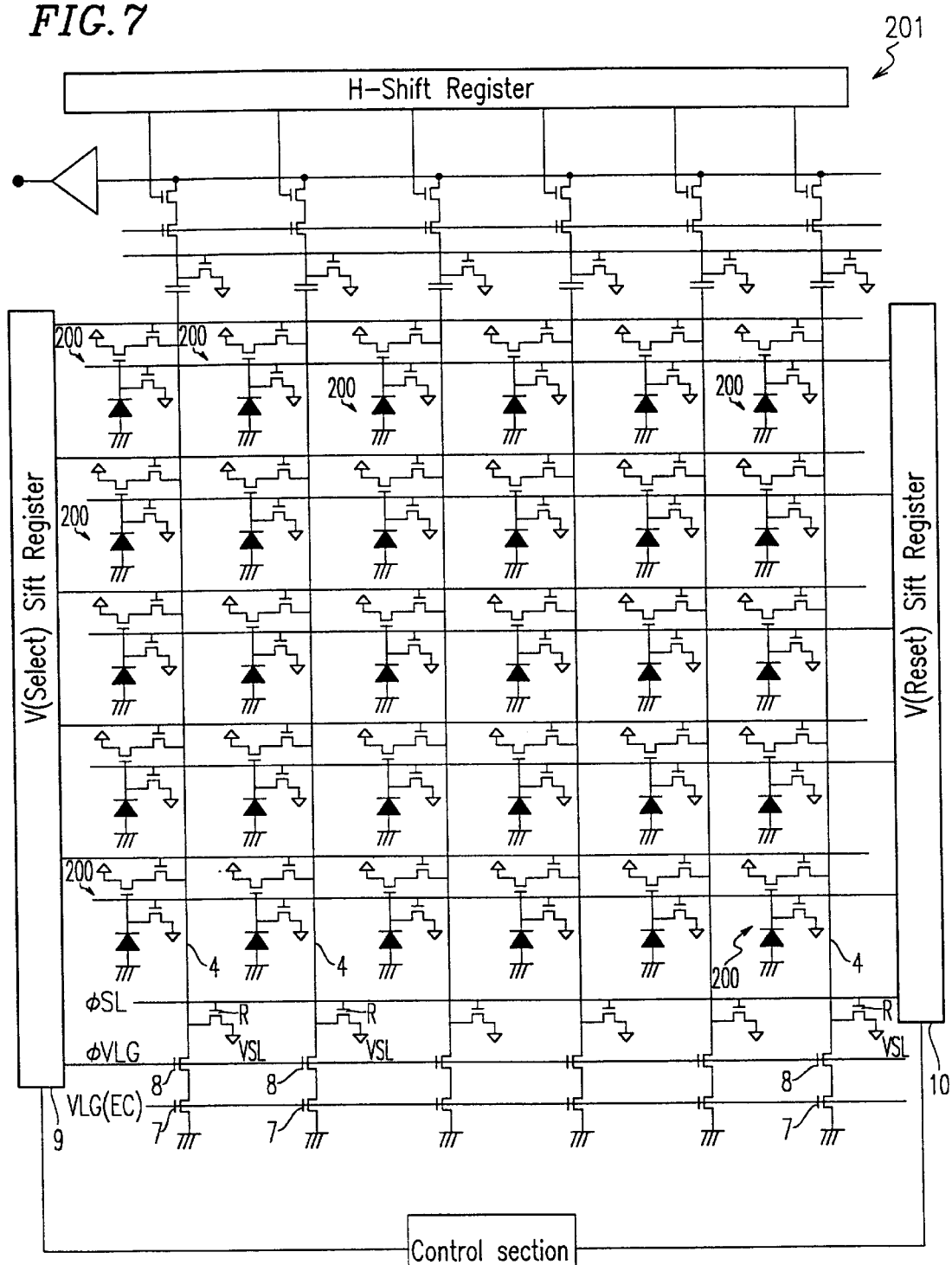
FIG. 7 illustrates a circuit configuration of an amplification type solid state imaging device according to Embodiment 2 of the present invention.

FIG. 7 illustrates a configuration of an amplification type solid state imaging device 201 according to Embodiment 2 of the present invention. FIG. 8 is a driving signal waveform diagram illustrating the operation of the amplification type solid state imaging device 201.

Referring to FIG. 7, the amplification type solid state imaging device 201 differs from the amplification type solid state imaging device 100 of Embodiment 1 (FIG. 1) in that the amplification type solid state imaging device 201 includes a plurality of column line reset MOS transistors R each of which provides a predetermined constant potential VSL to each of the column lines 4. One terminal of each column line reset MOS transistor R is connected to the column line 4, and the constant potential VSL is provided to the other terminal of the column line reset MOS transistor R. The gate terminals of the column line reset MOS transistors R are commonly connected with one another. The ON/OFF control signal φSL is applied to the gate terminals of the column line reset MOS transistors R. In Embodiment 2, the value of the constant potential VSL is set to be equal or substantially equal to the potential Vrst of the column line 4 when the first vertical scanning circuit 9 applies the read pulse 32 to the pixels 200.

The operation of Embodiment 2 will now be described with reference to the signal waveform diagram of FIG. 8.

In an operation of reading out signals from pixels along the $i^{th}$, row line V(i), the first vertical scanning circuit 9 is controlled so that the first vertical scanning circuit 9 applies the read pulse 31 to the selection MOS transistor 103 during the scanning period τH. In order to obtain the actual output signal amplitude ΔVs by using the CDS circuit 12 described above, the second vertical scanning circuit 10 is controlled so that the second vertical scanning circuit 10 applies the read reset pulse 33 to reset MOS transistor 105 during the read reset period τRST in the scanning period τH. In the read reset period τRST, the photodiode 101 is reset to the reset potential VDD. A control section 71 (FIG. 7) controls the first vertical scanning circuit 9 so that the first vertical scanning circuit 9 applies the read pulse 32 to the selection MOS transistor 103. Each column line 4 has a column line potential Vrst which is determined according to the reset potential VDD of the photodiode 101 of the $i^{th}$ row line V(i).

As shown in FIG. 8, the read pulse φSEL(i) and the control signal φVLG for the constant current source connection control MOS transistors 8 transition to the low level during the read reset period τRST within the scanning period τH, thereby terminating the supply of a constant current to the amplifier MOS transistors 102 of the pixels 200 along the selected row line. Thus, the column line 4 samples/holds the potential of the signal read out from the pixel 200 and goes into a floating state.

Next, the shutter reset operation of Embodiment 2 will be described. As described above, when a given row line ($i^{th}$ row) is shutter-reset by an application of a shutter reset pulse while another row line ($(i+1)^{th}$ row) is being selected, the photodiode 101 capacitively coupled with the column line 4 by the potential of the column line 4 is influenced by the potential of the column line 4. Thus, the reference potential of the photodiode of the pixel shifts from the intended level after the application of the shutter reset pulse.

In view of this, as shown in FIG. 8, the second vertical scanning circuit 10 applies a control pulse 81 to the column line reset MOS transistor R, simultaneously with the transition of the read pulse signal φSEL(i+1) to the low level in the read reset period τRST, thereby setting the ON/OFF control signal φSL to the high level and thus fixing the potential of the column line 4 to the constant potential VSL.

As a result, even when a given row line ($i^{th}$ row) is shutter-reset by an application of a shutter reset pulse 83 while another row line ($(i+1)^{th}$ row) is being selected, the potentials of all the column lines 4 are fixed to the constant potential VSL irrespective of the potentials of the signals read out from the pixels 200. Therefore, the influence of the column lines 4 on the reset potential for the photodiodes 101 of the pixels 200 which are capacitively coupled with the column lines 4 is uniform for all the pixels 200.

Thus, even when a high brightness object is being imaged, there is no variation in the reference potential of the photodiode of the pixel on which the shutter reset operation has been performed, which would otherwise occur when performing the shutter reset operation while imaging a high brightness object. Therefore, no ghost noise will occur.

FIG. 8 shows a case where the shutter reset pulse 83 is applied in a period during which a read reset pulse 84 is applied to the reset MOS transistor 105. However, the period for the application of the shutter reset pulse 83 can be set to any other period (any period other than the period for the application of a read pulse 85, 86 and the period for the application of the read reset pulse 84) according to the desired duration of the exposure period τSHB. In such a case, the control signal φSL for the column line reset MOS transistors R is brought to the high level in synchronization with the application of the shutter reset pulse 83, thereby setting the signal line potential to the constant potential VSL.

As described above, with the amplification type solid state imaging device of the present invention, it is possible to prevent the ghost noise which would otherwise occur when imaging a high brightness object, and thus to provide a uniform image.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An amplification type solid state imaging device, comprising a plurality of pixels arranged in a matrix each of which includes: a photodiode for photoelectric conversion; a signal amplification MOS transistor which functions as an amplifier for amplifying a change in the potential of the photodiode; a pixel selection MOS transistor; and a reset MOS transistor for resetting the potential of the photodiode to a predetermined initial potential, gate terminals of the selection MOS transistors of the pixels along each row being commonly connected together with a predetermined signal read pulse being applied to the gate terminals, gate terminals of the reset MOS transistors of the pixels along each row being commonly connected together with a predetermined reset pulse being applied to the gate terminals, and terminals on one end of the selection MOS transistors of the pixels along each column being commonly connected together to form a signal line, wherein a shutter reset operation is performed by applying a shutter operation reset pulse to the gate terminals of the reset MOS transistors during a period which is different from a period during which the reset pulse is applied to the gate terminals of the reset MOS transistors in a pixel signal read operation, wherein the shutter operation reset pulse is applied to the gate terminals of the reset MOS transistors in a state where a potential of the signal line is set to a predetermined fixed potential.

2. An amplification type solid state imaging device according to claim 1, wherein the shutter operation reset pulse is applied to the gate terminals of the reset MOS transistors during a period immediately after a reset signal read period in the pixel signal read operation.

3. An amplification type solid state imaging device according to claim 1 or 2, comprising fixed potential supply means for supplying the predetermined fixed potential to the signal line, wherein the shutter operation reset pulse is applied to the gate terminals of the reset MOS transistors by the fixed potential supply means in a period during which the fixed potential is supplied to the signal line.

4. An amplification type solid state imaging device according to claim 3, wherein: the fixed potential is supplied to the signal line by the fixed potential supply means in a period during which the reset pulse is applied to the gate terminals of the reset MOS transistors in the pixel signal read operation for a given row.

* * * * *